United States Patent [19]

Sallee

[11] Patent Number: 5,790,685

[45] Date of Patent: Aug. 4, 1998

[54] APPARATUS AND METHOD FOR DETECTING AND IMAGING METAL

[75] Inventor: Bradley T. Sallee, Austin, Tex.

[73] Assignee: Tracor, Inc., Austin, Tex.

[21] Appl. No.: 498,254

[22] Filed: Jun. 29, 1995

[51] Int. Cl.⁶ .................................................. G06K 9/00
[52] U.S. Cl. ............................................ 382/100; 340/572
[58] Field of Search ................................ 340/551, 541, 340/547; 324/329, 301; 382/103

[56] References Cited

U.S. PATENT DOCUMENTS

| | | | |
|---|---|---|---|
| 3,971,983 | 7/1976 | Jacquet | 324/41 |
| 4,068,164 | 1/1978 | Schwartz et al. | 324/226 |
| 4,357,535 | 11/1982 | Haas | 378/57 |
| 4,597,487 | 7/1986 | Crosby et al. | 194/209 |
| 4,779,048 | 10/1988 | Aichele | 340/547 |
| 4,821,023 | 4/1989 | Parks | 340/551 |
| 4,864,142 | 9/1989 | Gomberg | 250/390.04 |
| 5,039,981 | 8/1991 | Rodriguez | 340/551 |
| 5,121,105 | 6/1992 | Aittoniemi | 340/572 |
| 5,148,151 | 9/1992 | Podhrasky | 340/572 |
| 5,181,234 | 1/1993 | Smith | 378/87 |
| 5,187,723 | 2/1993 | Mueller-Stuercken | 377/6 |
| 5,493,517 | 2/1996 | Frazier | 364/564 |
| 5,499,013 | 3/1996 | Konotchick | 340/541 |
| 5,521,583 | 5/1996 | Frahm et al. | 340/551 |
| 5,537,041 | 7/1996 | Candy | 324/329 |

FOREIGN PATENT DOCUMENTS

| | | |
|---|---|---|
| 21 61 138 | 6/1973 | Germany . |
| 34 21 066 | 1/1986 | Germany . |
| 2 199 715 | 7/1988 | United Kingdom . |
| WO 90/05299 | 5/1990 | WIPO . |

OTHER PUBLICATIONS

International Search Report dated Oct. 25, 1996.

*Primary Examiner*—Joseph Mancuso
*Assistant Examiner*—Jayanti K. Patel
*Attorney, Agent, or Firm*—Arnold, White & Durkee

[57] ABSTRACT

This invention relates to the field of metal detectors. More particularly, it relates to an imaging metal detector for imaging the metal on subjects passing through a spatial plane providing the specific location, shape and mass of the metal object. This invention makes use of an array of active sensors to transmit and receive magnetic beams and a computer for generating an image of the metal object based upon the data received from the sensors. Through the use of this invention it is possible to scan several subjects at the same time and generate a two- or three-dimensional image of any metal object on the subject as well as precise location, mass and type of metal contained in the object.

36 Claims, 16 Drawing Sheets

APPARATUS AND METHOD FOR DETECTING AND IMAGING METAL

BACKGROUND OF THE INVENTION

It is desired to provide a metal detector that is capable of imaging the metal on persons or objects passing through a spatial plane, providing location, shape, and mass of the metal objects.

In the standard metal detectors most commonly used today, a passive ferromagnetic device measures attenuations in the earth's magnetic field created by the presence of a metallic object. A disadvantage of this current device is that the sensor is incapable of giving the precise location of the metallic object. Furthermore, information pertaining to the shape and mass of the object is not available when using the current metal detection devices. The inability to provide a more precise location and information about metallic objects detected requires more intrusive detection means such as a hand-held metal detection wand or a physical search.

Another disadvantage of the current metal detection systems is that only one person or object may be scanned at any given time. This limitation hinders pedestrian traffic and is thought to be intrusive.

SUMMARY OF THE INVENTION

This invention describes an imaging metal detector used to generate two or three dimensional images of metallic objects within a given imaged plane (i.e., the two-dimensional plane to be scanned for metallic objects). This imaged plane may contain several objects simultaneously. The present invention provides the precise location of all metallic or electrically conductive or dielectric objects, their shape, their mass, and the type of metal or conductors contained within those objects. The invention may be operated using low frequency electromagnetic radiation, similar to that of a 60 Hz house current, and thus, is intrinsically safe for the subjects being scanned. Further, the use of low frequency electromagnetic radiation simplifies the electronics because diffraction effects are minimal. This simplification allows for rapid imaging calculations.

The present invention comprises a sensor ring consisting of a plurality of sensors wrapped around ferrite stubs mounted on a ferrite loop. The ferrite loop is arranged to substantially surround the imaged plane. Each sensor is switchably coupled to a transmitter and a receiver allowing the sensor to act as either a transmitter or receiver of a magnetic signal. Alternatively, separate transmit and receive sensors may be used. A computer is coupled to the receiver for sending a receive address code and to the transmitter for sending a transmit address code. The transmitter and receiver then activate the corresponding sensors for receipt and transmission of the magnetic beam. The computer is programmed to: provide transmit address codes to the transmitter and receive address codes to the receiver, accept image data from the receiver, and to process the image data and generate a two-dimensional metal image indicating the distribution of metal in the imaged plane.

The generated metal image may be displayed on a video monitor. Also, a photographic camera may be utilized to provide a video image of the imaged plane for overlay with the generated metal image.

The method of detecting the presence and distribution of metal in an imaged plane consists of utilizing the above described apparatus in the following manner:

transmitting a signal from at least one sensor and receiving the attenuated signal at least one other sensor, the receiving sensor providing information representative of the attenuated signal (e.g. raw voltages) to the computer;

repeating the transmitting and receiving step using a different transmitter sensor until a sufficient number of attenuated signals have been calculated to generate an image of the metal contained in the imaged plane; and generating an image of the metal contained in the imaged plane from the information provided to the computer.

The generating step may be carried out as follows:

calibrating sensors by:

zeroing the raw voltages with respect to reference voltages taken with no metal in said imaged plane by subtracting the reference voltages from the raw voltages;

converting zeroed voltages to decibels relative to the reference voltage; and correcting for the signal gain caused by the position of the sensor which provided the raw voltage to derive calibrated voltages;

calculating a raw image by:

averaging the calibrated voltages corresponding to all scan lines that pass through a given pixel for each pixel; and calculating the back calculated voltage at the receiver sensors corresponding to the raw image by determining what each sensor would measure for the raw image;

optimizing the raw image to approximately match the calibrated voltages by:

dividing the calibrated voltage by the back calculated voltage for each scan line to derive a scaling constant for each scan line; and multiplying the product of the scaling constants corresponding to the scan lines which pass through a given pixel by the average of the calibrated voltages for that given pixel to derive an optimized voltage; and comparing the product of the scaling constants to one:

if the product is within a preselected threshold of one, then the metal image is output;

otherwise, the raw voltage is set equal to the optimized voltage and repeating the optimizing step until the product is within the preselected threshold.

Alternatively, the computer may be further programmed to compare the generated metal image to a set of metal images corresponding to a variety of weapons and other threatening objects. If a match is found, the operator can be alerted by an alarm, the image may be highlighted on the screen, or other appropriate action may be taken as deemed necessary.

Also, the imaged plane may be scanned consecutively several times as the objects moves through the imaged plane, and the generated two-dimensional metal images may be placed together to form a three-dimensional image.

Further, the imaged plane may be scanned at several different frequencies. The generated multi-frequency profile of the object may be used to identify the type of metal detected by comparison to known profiles. It is also possible to calculate the mass of the metallic object if a three-dimensional image is generated in conjunction with the profile. Further, the metal image profile may be overlaid on a photographic or x-ray image.

It will be apparent that a person of skill in the art, having the benefit of this disclosure of this invention, may conceive of numerous other applications for which this invention will be beneficial. Nothing in this disclosure limits the application of the invention herein to the embodiments and the applications expressly described herein.

BRIEF DESCRIPTION OF THE DRAWINGS

So that the manner in which the above recited advantages and features of the present invention, as well as others which will become apparent, are attained and can be understood in detail, a more particular description of the invention summarized above may be had by reference to a preferred embodiment thereof which was illustrated in the appended drawings, which drawings form a part of this specification.

It is to be noted, however, that the appended drawings illustrate only typical embodiments of the invention and are therefore not to be considered limiting of its scope, for the invention may admit to other equally effective embodiments.

DETAILED DESCRIPTION OF THE PREFERRED EMBODIMENTS

Figure 1:
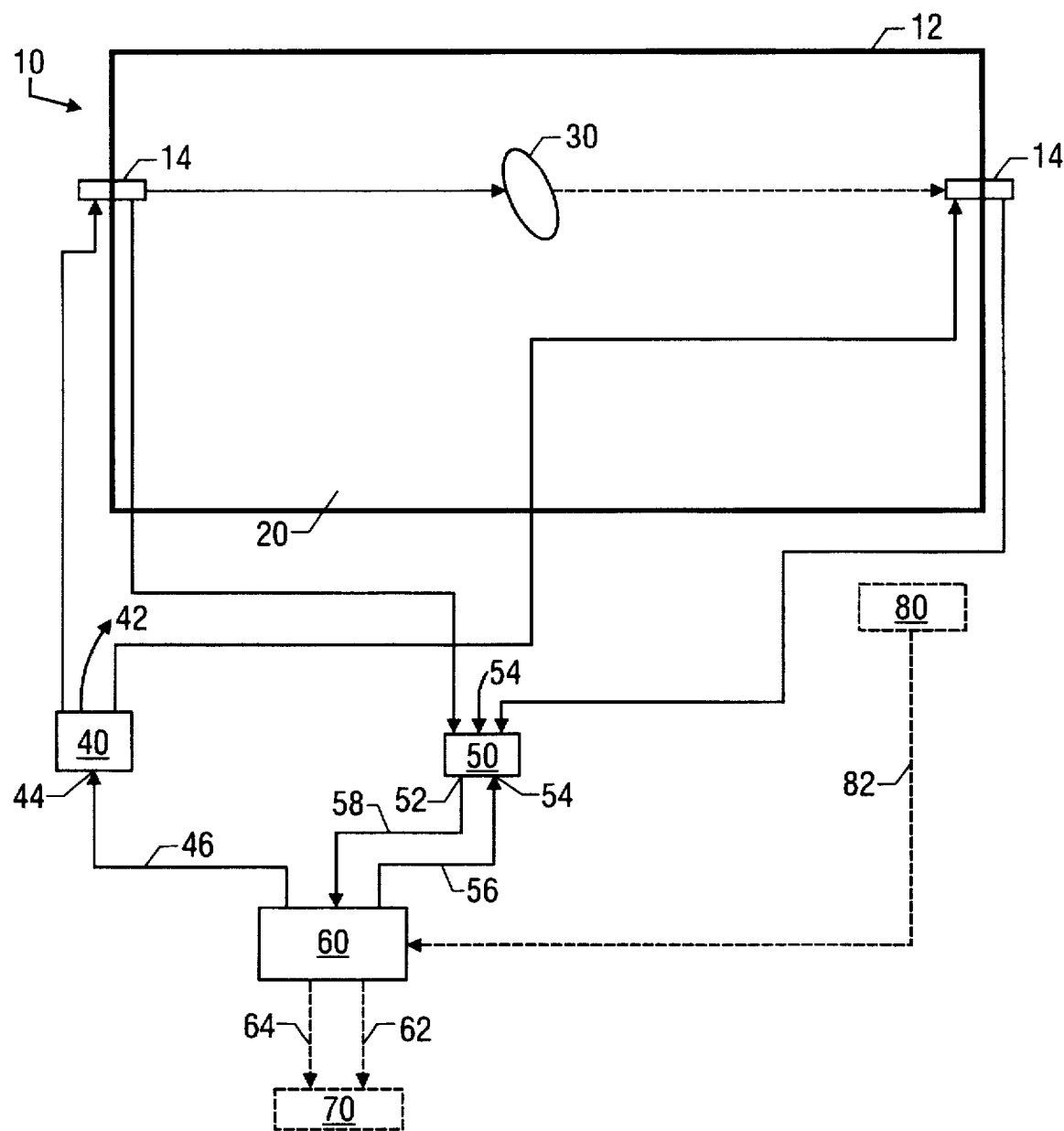
FIG. 1 is a schematic drawing of an imaging metal detector according to this invention.

FIG. 1 illustrates an imaging metal detector that exemplifies a preferred embodiment of this invention. A sensor ring (10) surrounds the imaged plane (20) which contains the metallic or electrically conductive object (30) desired to be located and analyzed. Alternatively, the sensor ring may be "U" shaped (omitting the lower portion of the loop), if the imaged plane is narrow in dimension as, for example, in a narrow doorway.

The sensor ring (10) is comprised of a ferrite loop (12) with sensors (14) mounted at spaced intervals on the loop. The ferrite loop (12) consists of a rubber ring loaded with ferrite powder or a series of ferrite rods placed end-to-end, and substantially surrounds the imaged plane (20). The entire sensor ring (10) may be covered with molding for a more architecturally aesthetic appearance and to reduce the intrusive appearance of the imaging metal detector. The sensors are ferrite stubs with 30–50 turn coils wrapped around them and are mounted with their central axis pointing into the loop. These sensors are clipped onto the ferrite loop and switchably connected to a transmitter and a receiver. The number and spacing of the sensors may be adjusted according to the desired amount of detail in the resultant metal image. It is found that for a 5.5'×7' ferrite loop a 1" spacing of sensors is adequate and provides a 60×84 pixel image. A ⅛" spacing of sensors in the same loop would provide a 528×672 pixel image.

The transmitter (40) has multiple outputs (42) which are connected to each sensor (14). Each sensor (14) is also connected to one input (54) of the receiver (50). In turn, the receiver (50) and the transmitter (40) are connected to a computer (60) by input ports (44 & 54) and an output port (52).

The transmitter (40) receives a transmit address code (46) from the computer (60) which corresponds to a transmit sensor (14). The transmitter (40) then sends a sinusoidal activation signal to the transmit sensor (14) having the corresponding address code (46). The preferred frequency range of the activation signal is 5–85 kHz. The most preferable frequency is around 80 kHz because this avoids local broadcast bands and senses most common metals. The frequency range is limited by the principal dimension of the loop. In a preferred embodiment, the wavelength should be at least ten times larger than the longest loop dimension to minimize diffraction effects. In a more preferred embodiment, the wavelength is at least twenty times larger than the longest dimension. The transmitter may be operated at as high as 20 volts, but about 2.5 volts is preferred.

Likewise, the receiver(s) (50) accepts one or more receive address code(s) (56) from the computer (60) and sends an activation signal to the corresponding receive sensor(s). The receiver (50) has a series of inputs (54) for receiving attenuated signal measurements from receive sensors (14) and a receive address code (56) from the computer (60), and one output (52) for sending metal image data (58) to the computer (60). The receiver may be a high Q op amp or a digital signal processor.

The transmit sensor (14) then generates a electromagnetic field. This magnetic field will be attenuated by the metallic object (30) blocking the magnetic field. Alternatively, several transmit sensors may be activated simultaneously provided they are phase coherent. This alternative allows for faster scanning times, but requires a more complex algorithm as feedback may become a problem. This attenuated signal is then received by one or more receive sensors (14). The receive sensors then send signals back to the receiver (50) which in turn provides metal image data representative of the attenuated signal to the computer (58).

The sensors may be switchably connected to the transmitter and receiver, so that each sensor may be used to either transmit or receive the magnetic signal. Alternatively, sensors may be used solely for either transmitting or receiving.

The computer (60) then calculates the degree of signal attenuation corresponding to each receive address code (56). This procedure is repeated using a variety of transmit sensors and receive sensors until a sufficient number of attenuated signals have been calculated to generate an image (62) of the metallic object (30) in desired detail. This requires about ⅙ as many readings as desired pixels.

Alternative embodiments of the present invention is indicated in FIG. 1 by dashed lines. In one alternative embodiment, the metal image (62) which is generated by the computer (60) may be displayed on a monitor (70).

In another alternative embodiment of the present invention, a photographic camera (80) may record a video image (82) of the image plane (20) and send this video image (82) to the monitor (70) via the computer (60). The metal image (62) may then be overlaid onto the video image (82).

In another alternative embodiment, several images may be generated as the object passes through the imaged plane. These two-dimensional images may then be placed together to generate a three-dimensional image.

In another embodiment, the object may be generated at various frequencies. From these scans a multi-frequency profile of the metal may be generated and used to identify the type of metal. This information may be overlaid or used in conjunction with a photographic image, x-ray image, or three-dimensional image. Note that if one were to obtain a three-dimensional image and metal image profile, one could calculate the mass of the object.

Figure 2:
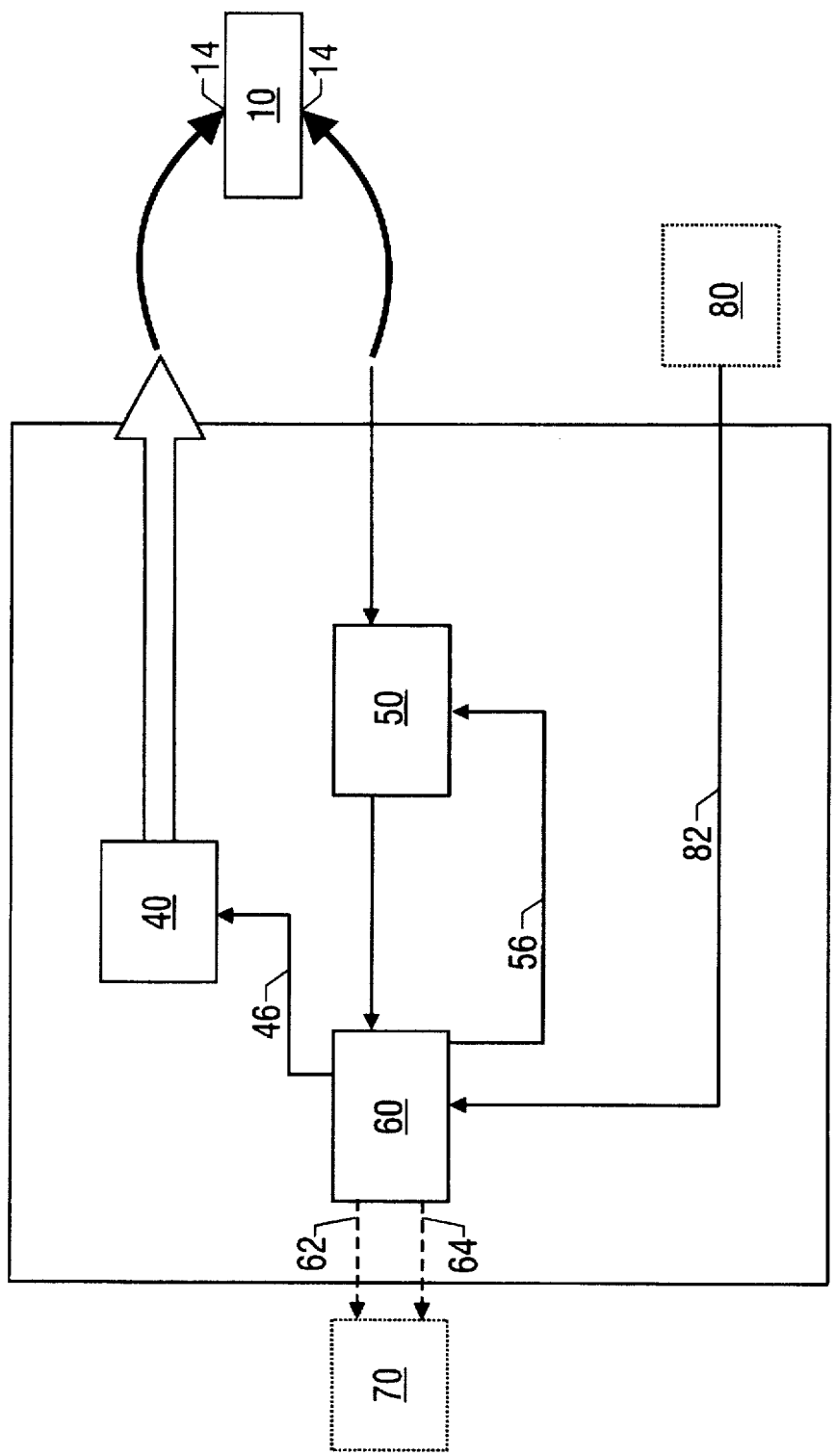
FIG. 2 is a block diagram of one embodiment of the hardware for the imaging metal detector according to a preferred embodiment.

FIG. 2 depicts one embodiment of the hardware for an imaging metal detector according to a preferred embodiment. The computer (60) sends a transmit address code (46) to the transmitter (40) which then activates the addressed transmit sensor (14). The computer (60) also sends one or more receive address codes (56) to the receiver (50) which then activates the addressed receive sensors (14).

The receive sensors (14) accept the attenuated electromagnetic signal from the transmit sensor (14) and relay signals back to the receiver (50) which in turn sends a signal representative of the attenuated signals to the computer (60).

This process of transmitting and receiving electromagnetic signals across the imaged plane is repeated until a sufficient amount of information is gathered to generate a metal image. In one alternative embodiment, the computer (60) relays the metal image (62) to a monitor (70). In another alternative embodiment, a photographic camera (80) relays video image data (82) of the imaged plane to the computer (60) which may then send a video image (64) to the monitor (70) for overlay with the metal image (62).

Figure 3:
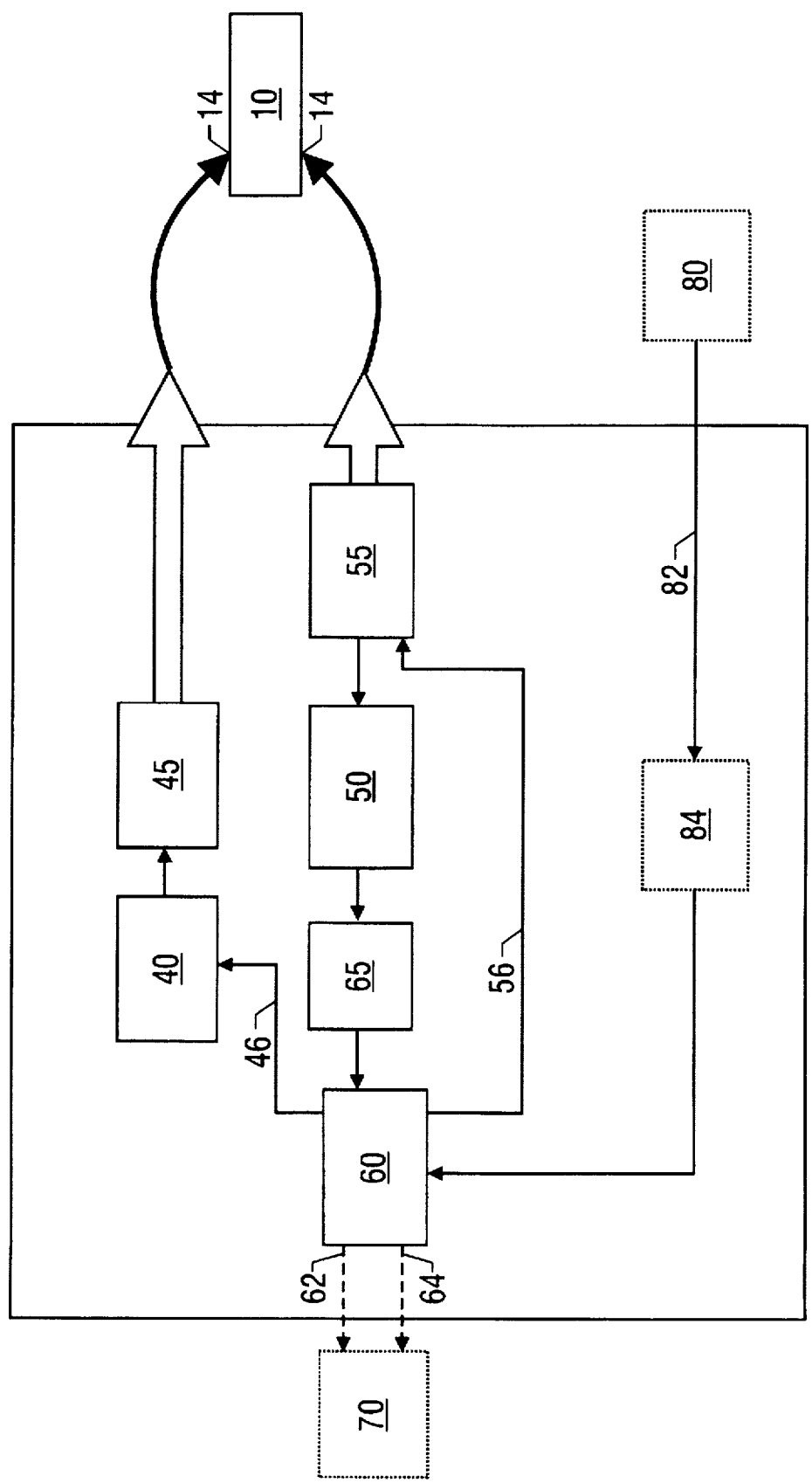
FIG. 3 is a block diagram of one embodiment of the hardware for the imaging metal detector according to a preferred embodiment.

FIG. 3 depicts one embodiment of the hardware for the imaging metal detector according to a preferred embodiment. This embodiment includes a transmitter MUX (45) and receiver MUX (55) for accepting address codes (46 and 56, respectively) from the computer (60).

Also, depicted in this alternative embodiment is a frame grabber card (84) for holding video image data (82) from the photographic camera (80) and relaying it to the computer (60).

Lastly, the alternative embodiment shown includes an A/D convertor (65) for converting the analog signals from the receiver to digital codes for the computer (60).

Alternatively, as in a previous embodiment, a monitor (70) may be used to display the video image (64) and the metal image (62).

Figure 4:
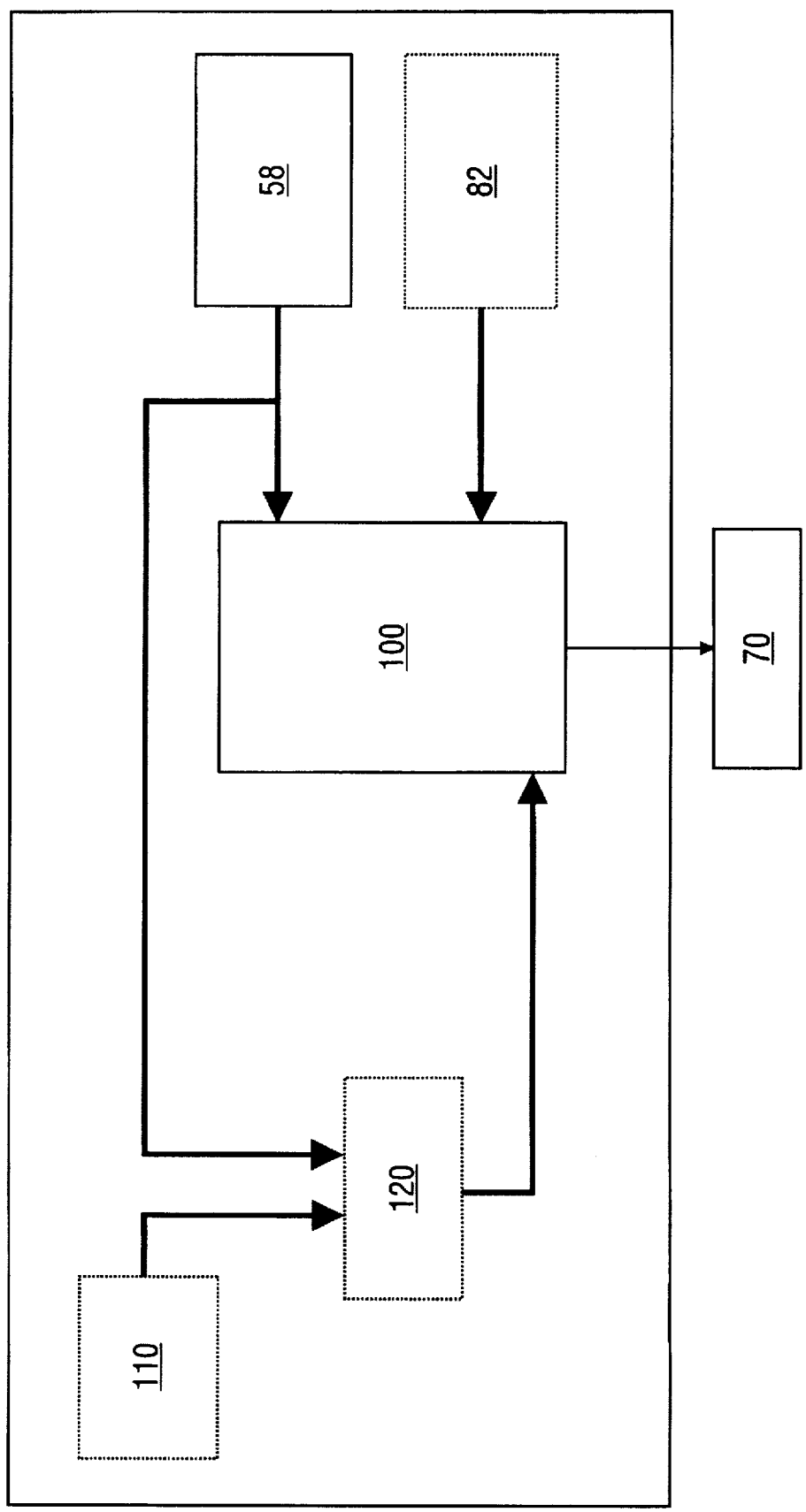
FIG. 4 is a block diagram of one embodiment of the software of the imaging metal detector according to a preferred embodiment.

FIG. 4 is a block diagram of one embodiment of the software for the imaging metal detector. The metal image data (58) is received by the image software (100), and a metal image is generated which may then be displayed on a monitor (70).

In one alternative embodiment, a photographic camera (80) (not shown) may send video data (82) to the image software (100) which then generates a video image and sends it to the monitor (70). The imaging software may then overlay the video image with the metal image.

In yet another alternative embodiment of the present invention, the metal image data (58), in addition to being sent to imaging software (100), is sent to comparison software (120) which compares the metal image data to a set of threat-match images (110). The threat-match images (110) are a catalog of metal image data for a variety of known weapons or other objects desired to be located. If the comparison software (120) finds a threat-match it then signals the imaging software (100) and an appropriate action may be taken (e.g. sound an alarm, display information known about the particular weapon, overlay the video image with an image of the known weapon on the monitor (70), etc.).

Figure 5:
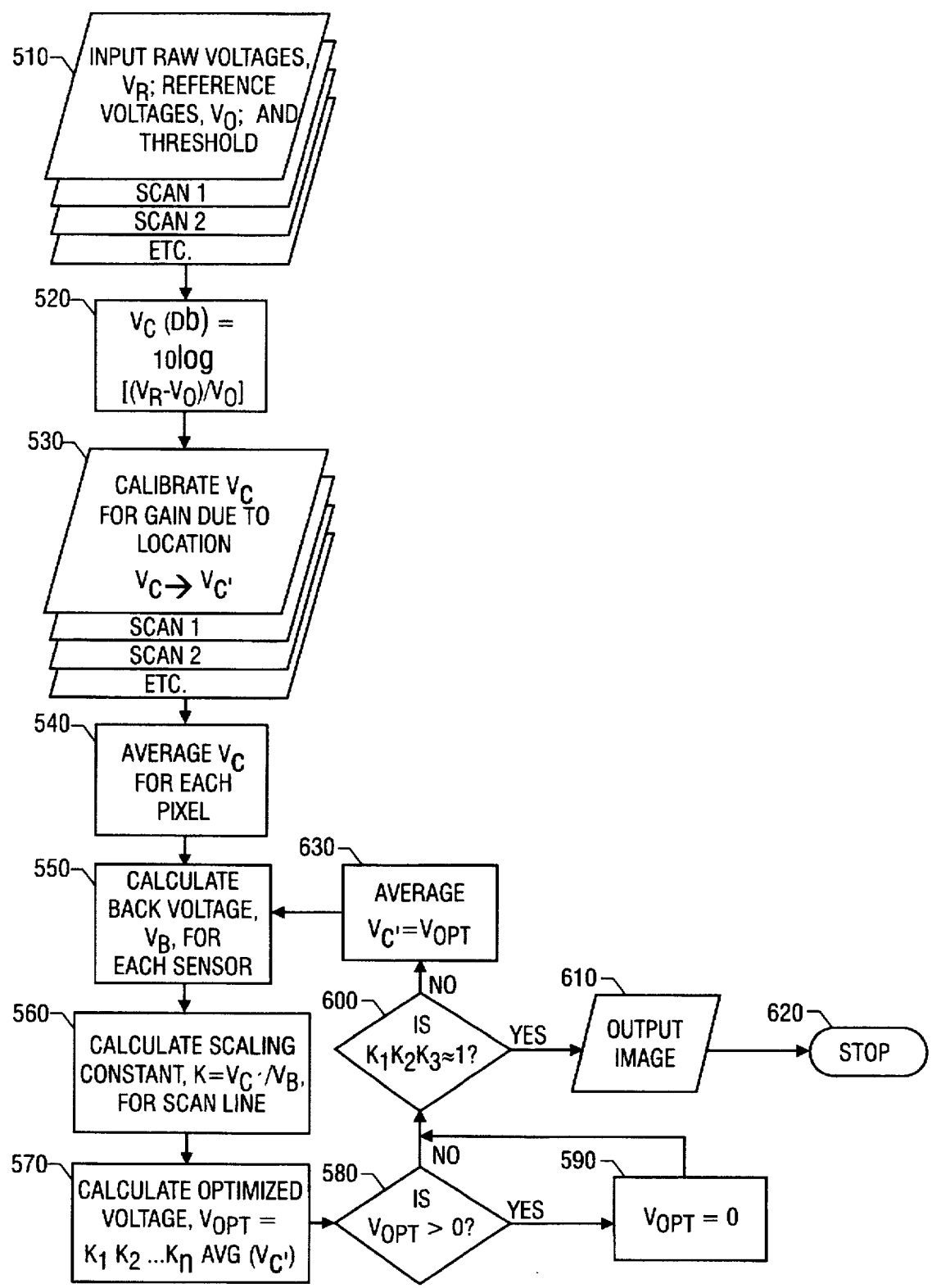
FIG. 5 is a flow chart of one embodiment of the software of the imaging metal detector according to a preferred embodiment.

FIG. 5 is a flow chart for one embodiment of the software for the imaging metal detector according to a preferred embodiment. The software performs several functions. First, it calibrates the voltages received from the sensors with objects in the imaged plane relative to those received when no items are in the imaged planed. This is done by receiving the raw voltages, $V_R$, from the receiving sensors (510) and subtracting the reference voltages, $V_O$, obtained when no items were present in the imaged plane (520) and converting to Db (i.e. $10 \log[(V_R-V_O)/V_O]=V_c$ (Db)). Lastly, the voltages are calibrated to correct for the position of the particular sensor in the loop (530). That is, the position of a given sensor causes differences in the signal gain which is corrected in this step. These calibration steps (i.e. 510–530) are carried out for each scan to obtain the corresponding calibrated voltages, $V_c'$.

In practice one way of correcting for signal gain due to position of a sensor is to suspend a piece of metal into the imaged plane and scan it. The metal is then rastered to each pixel and scanned. The measurements should be equal at all sensors. To the extent the measurements differ due to the location of given sensors, a map can be generated with correction factors.

Second, the software generates a metal image from the metal image data sent by the receiver. In generating a metal image, an approximation (i.e. numerical method) is used rather than a closed form solution because the number of sensors multiplied by the numbers of scans is usually less than the number of pixels. For example, a 100×100 sensor array would yield 100 known from a horizontal scan, 100 known from a vertical scan, 200 known from a 45 degree diagonal scan, and 10,000 pixels to solve for. Thus, there are more unknowns than equations. The ratio of the number of unknowns to the number of equations which will form a reasonable image is dependent upon the complexity of the image and the particular application. It has been found that for a normal sparsely populated image, up to a six to one ratio will give a good image. For more complex images or for application requiring higher resolutions, the ratio will approach one.

One way of quickly generating the metal image, is to first calculate a raw image, and then, apply a correction factor to produce a more detailed image. In calculating a raw image, first the calibrated voltages, $V_c'$, corresponding to a given pixel are averaged together (540) for each pixel. The back calculated voltage, $V_B$, corresponding to the raw image is then calculated for each sensor (550). That is, the Db attenuation which would be expected to be received by a given sensor based upon the raw image is determined. This is done by adding the $V_c'$ values for each scan line. The calibrated voltage $V_c'$ (i.e. from 530) is divided by the back calculated voltage (i.e. from 550) for each scan line to arrive at a scaling constant, k, (560) corresponding to that scan line (i.e. $k=V_c'/V_B$). This scaling constant, k, is then multiplied by the voltage average, $AVG(V_c')$, for each pixel on that scan line (i.e. from 540) which results in an optimized voltage, $V_{OPT}$, at the sensor for that scan line (i.e. $V_{OPT}=k_1 k_2 k_3 \ldots k_n AVG(V_c')$) (570). Thus, each pixel is multiplied by the correction factors from the several scan lines which intersect it. If the resulting signal, $V_{OPT}$, at the pixel is positive, the signal is set to the null signal (i.e. if $V_{OPT}>0$, then $V_{OPT}=0$) (580–590). If the product of the scaling factors (i.e. $k_1, k_2 k_3 \ldots k_n$) is within a preselected threshold value, then the image is output (600–620). Otherwise, a raw image is once again recalculated (i.e. return to 550) using the $V_{OPT}$ values (630) (i.e. $AVG(V_c'=V_{OPT})$). This is repeated until the product of scaling factors is smaller than the threshold. Although, the threshold value will vary, depending upon the a number of factors, a threshold value which results in about 10 iterations is generally sufficient for most common applications. The resulting image shows metal and RF absorbing material images with a pixel size equal to the sensor spacing.

In an alternative embodiment (not shown), image recognition programs can be used to determine if a metal image matches a known set of threat objects (e.g., knives, handguns, rifles, etc). When matches are found, those objects can be enhanced for the operator, an alarm can be sounded, etc.

Also, a video image may be overlaid onto the metal image to facilitate locating the metallic object in relation to non-metallic objects and allowing human discrimination of objects based upon their physical location.

There are an infinite number of possible algorithms for generating an image from data received from the sensors. Obviously, any number of scans may be taken in any number of directions. Multiple transmission and receptions may take place simultaneously if the transmissions are in phase. There are a variety of different ways to calibrate the raw voltages. Likewise, there are a variety of ways to generate a raw image. Rather than averaging voltages to generate a raw image, numerous formulations and methods could be employed for a more accurate raw image. The method depicted in FIG. 5 is just one example among many of ways to generate an image from the attenuation data collected.

FIGS. 6a–11 depict a made up example which traces the flowchart of FIG. 5. This example does not use realistic numbers and is intended solely for illustrative purposes. These figures depict an imaged space with 4 sensors running horizontally at the bottom of the space (labeled 1, 2, 3, and i), 4 sensors running vertically on the left side of the space (labeled 1, 2, 3, and j), and one sensor at the intersection of the axes. For clarity, only a small portion of the imaged space is shown. Each intersection in the imaged space represents a pixel. The four dots contained among the pixels (labeled -10, -7, -1, and -3, in FIG. 6a) represent metallic or conductive objects in the imaged plane, and the number adjacent to them in parenthesis represents the amount of attenuation encountered at each point.

Figure 6A:
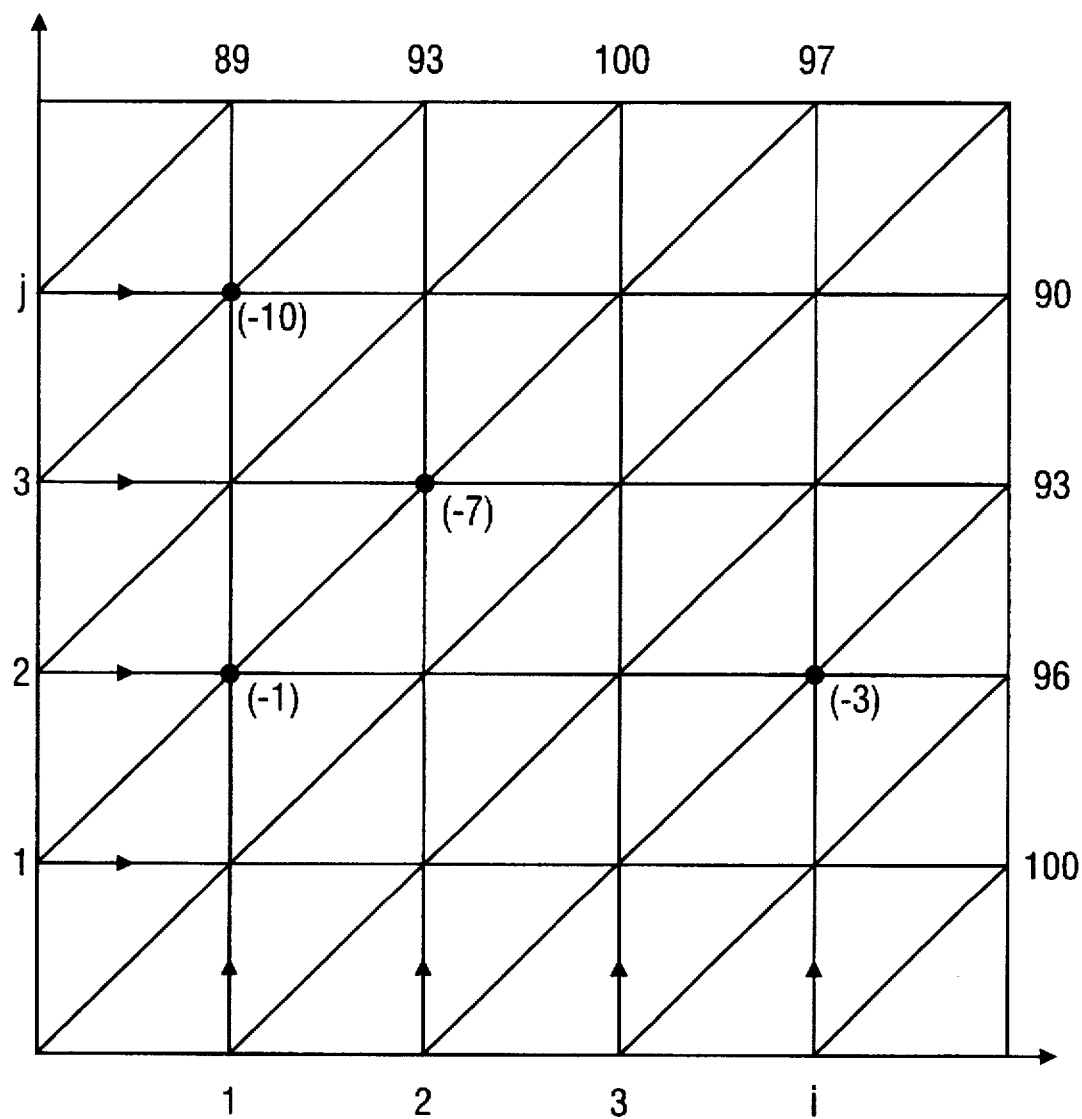
FIGS. 6a–11 are diagrams of an example run of the flow chart in FIG. 5. These diagrams do not contain realistic numbers and are for illustrative purposes only.
Figure 6B:
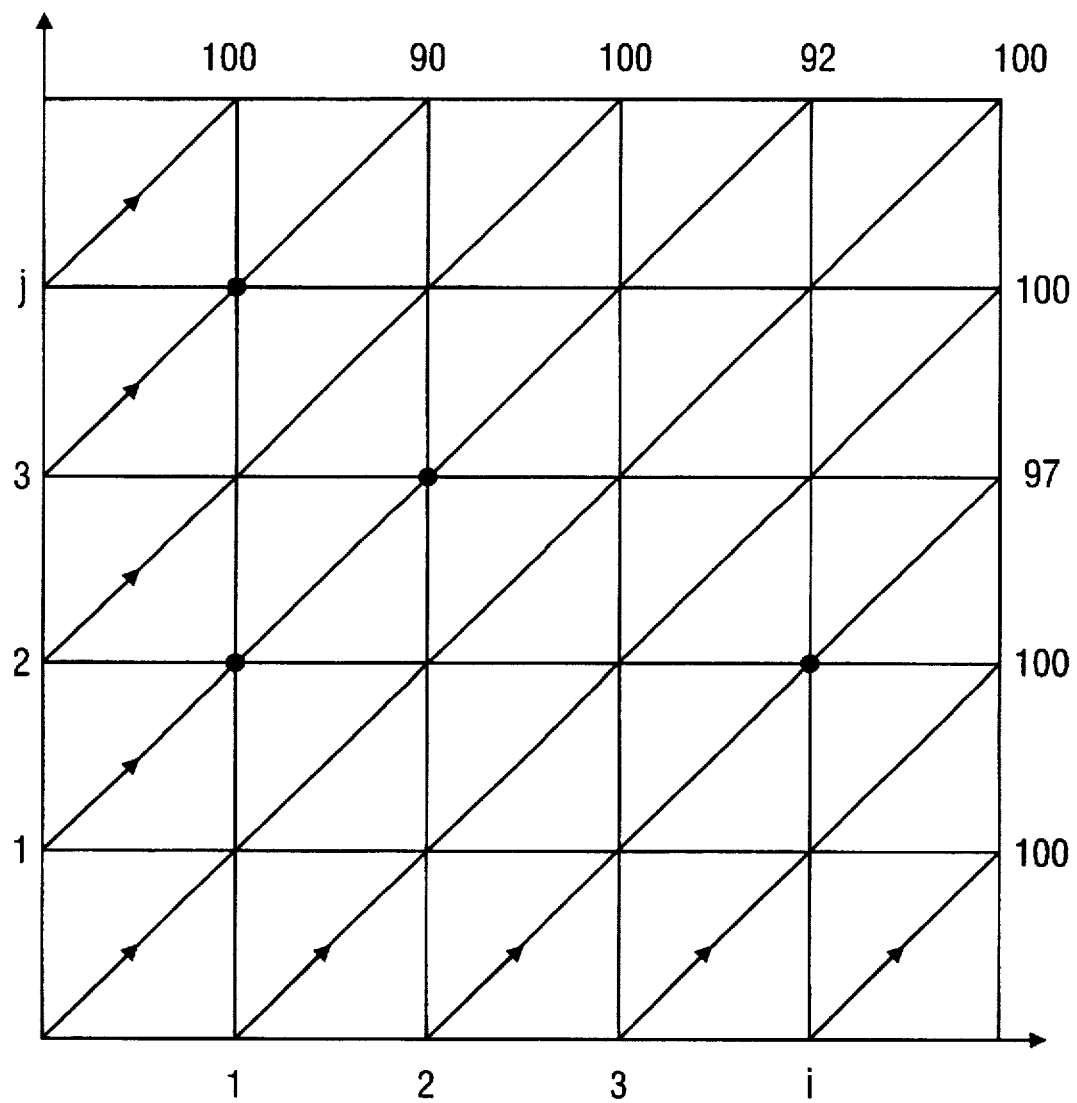

FIG. 6a is a depiction of a horizontal and vertical scan of the imaged space. The numbers to the right of the plane are the voltages measured from the horizontal scan (i.e. 90, 93, 96, and 100). Likewise, the numbers at the top of the plane are the voltages measured from the vertical scan (i.e. 89, 93, 100, and 97). FIG. 6b is similar to FIG. 6a, but the scan is taken diagonally. Thus, FIGS. 6a and 6b correspond to block 510 of FIG. 5.

Figure 7A:
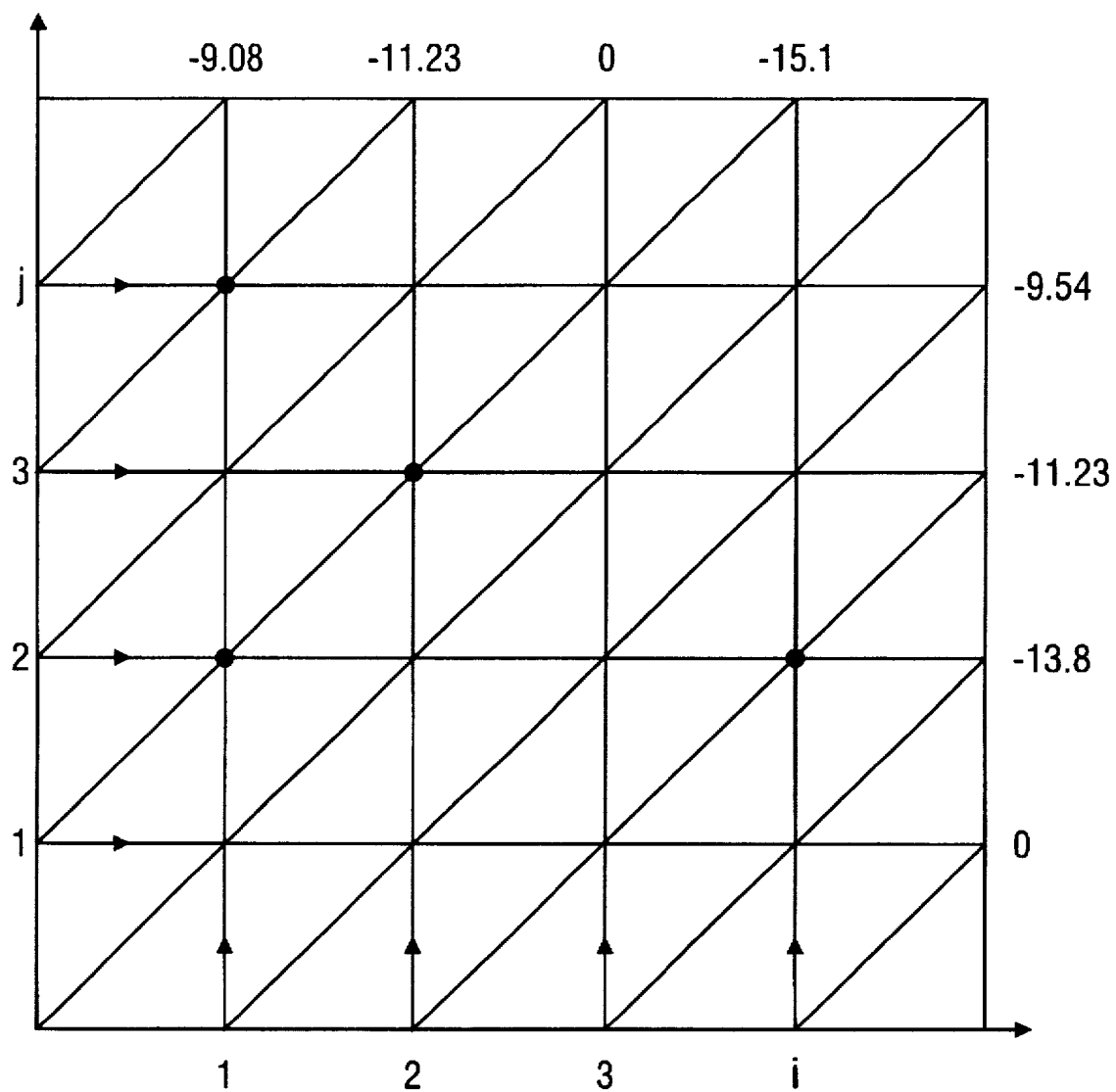
Figure 7B:
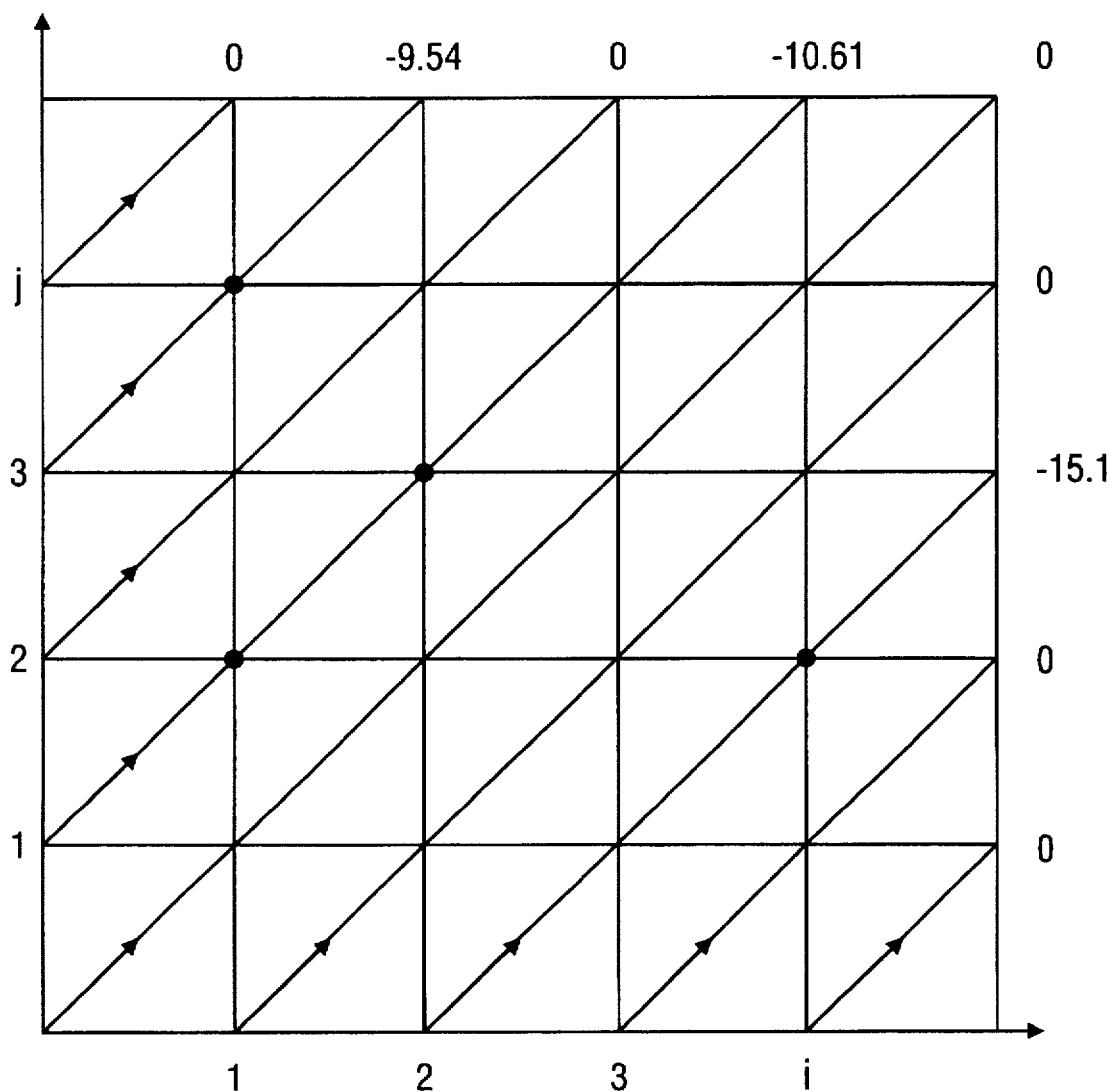

FIGS. 7a and 7b depict the raw voltages being calibrated in the horizontal and vertical directions and the diagonal direction, respectively. For simplicity, it was assumed that no correction was necessary for gain due to sensor location (i.e. $V_c'=V_o$). Thus, these figures correspond to blocks 520 and 530 of FIG. 5.

Figure 8:
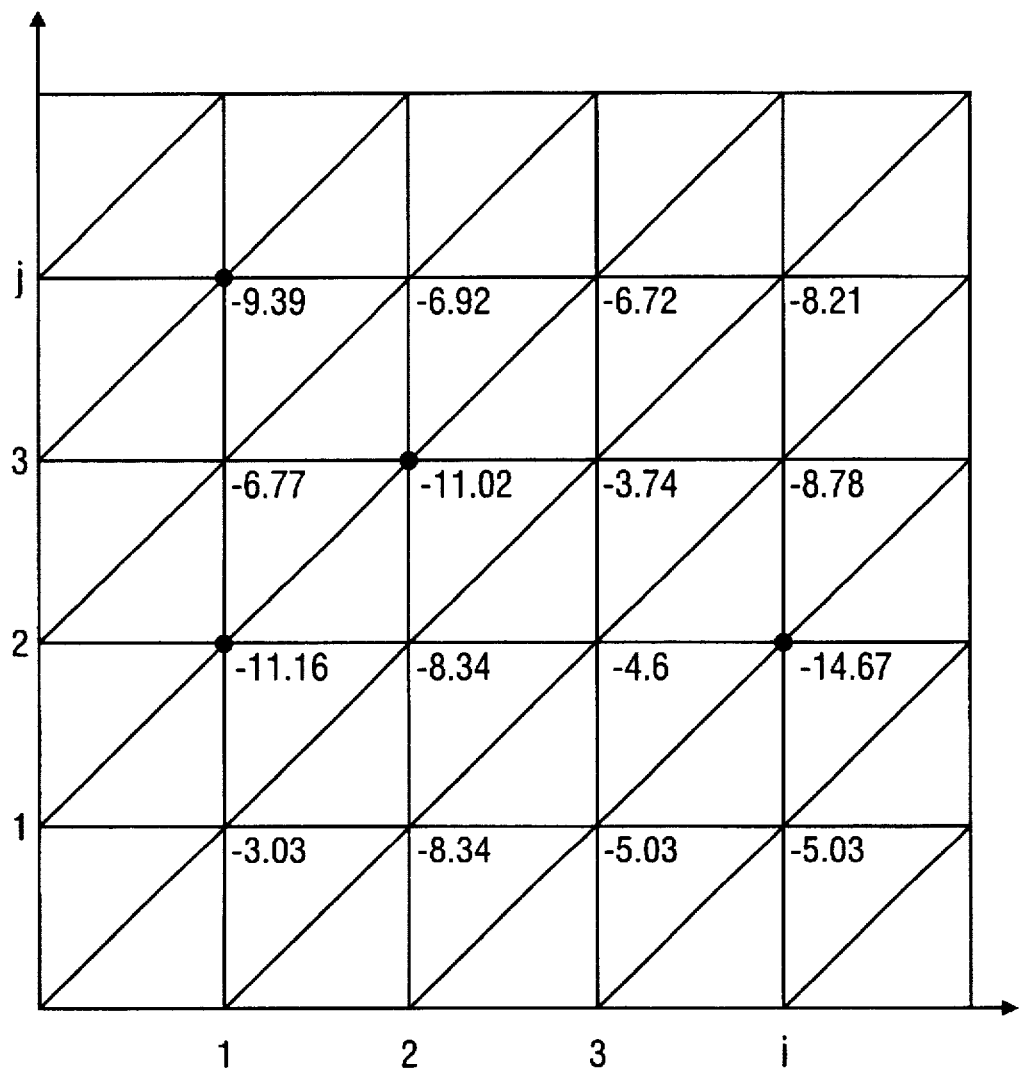

FIG. 8 depicts an averaging of calibrated voltages for each pixel which corresponds to block 540 in FIG. 5.

Figure 9A:
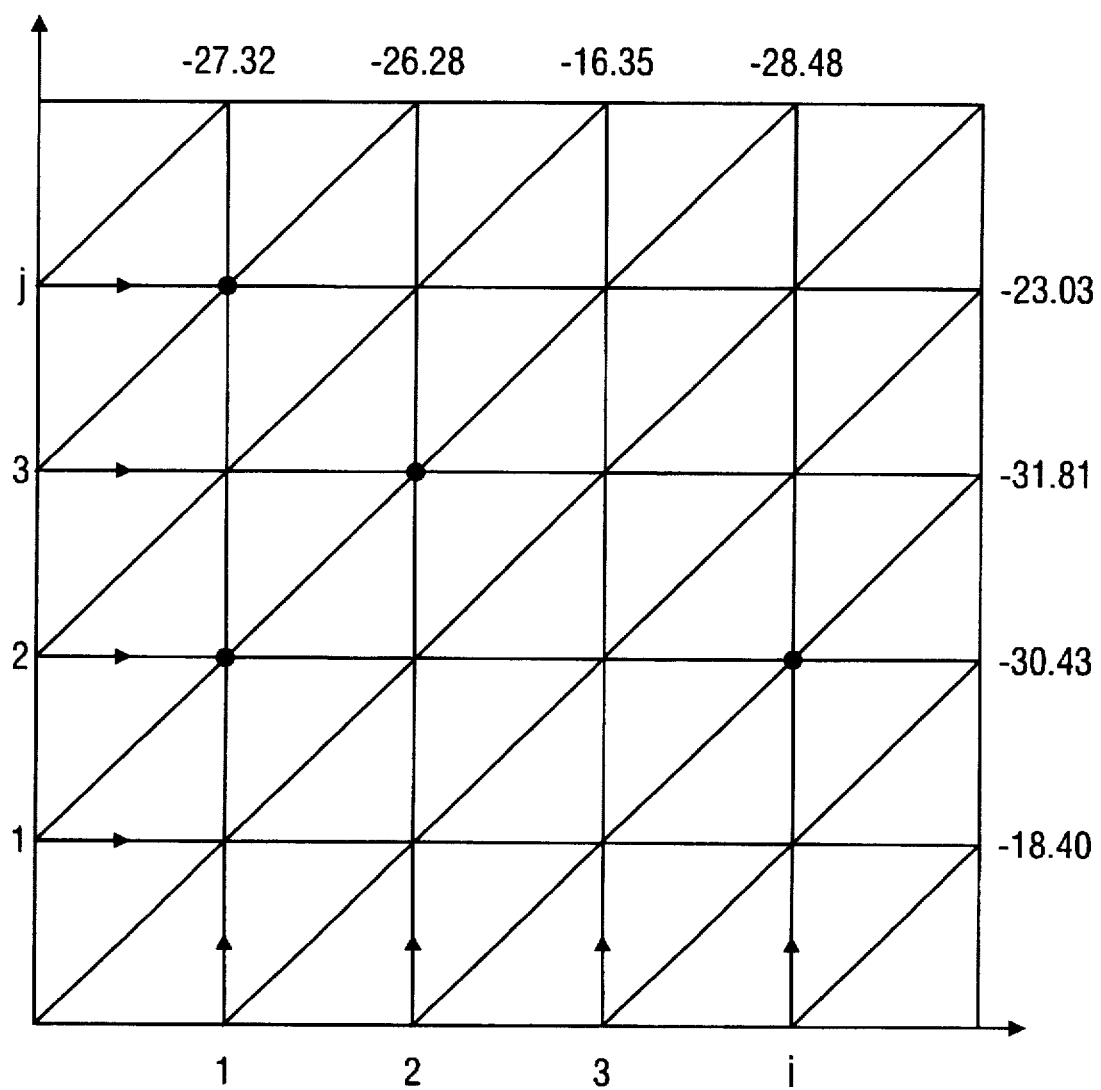
Figure 9B:
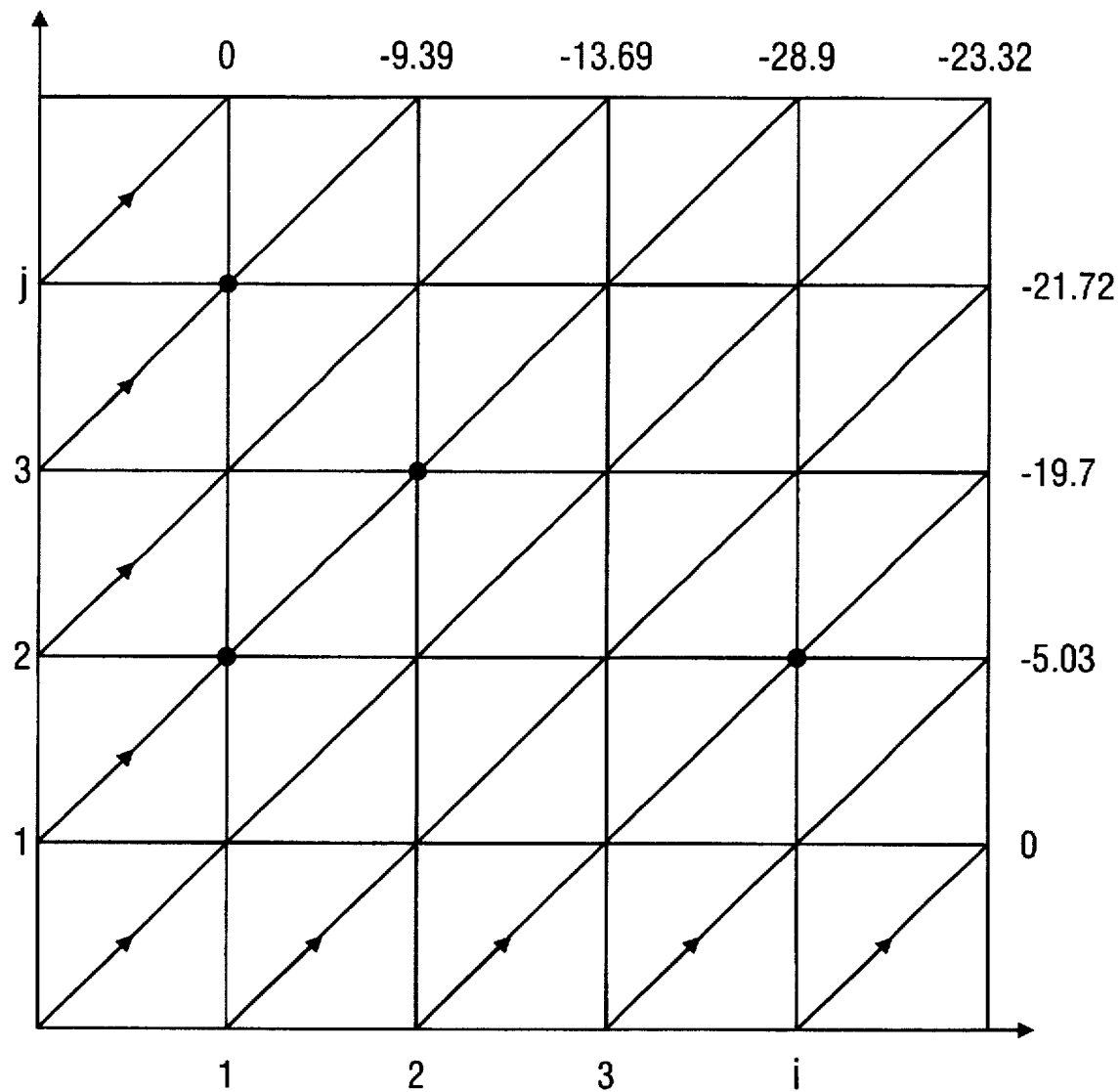

As, in block 550 of FIG. 5, the back voltages are then calculated as depicted in FIGS. 9a and 9b. The back voltages, $V_B$, are calculated by adding the average calibrated voltages, AVG ($V_c'$), along a given scan line.

Figure 10A:
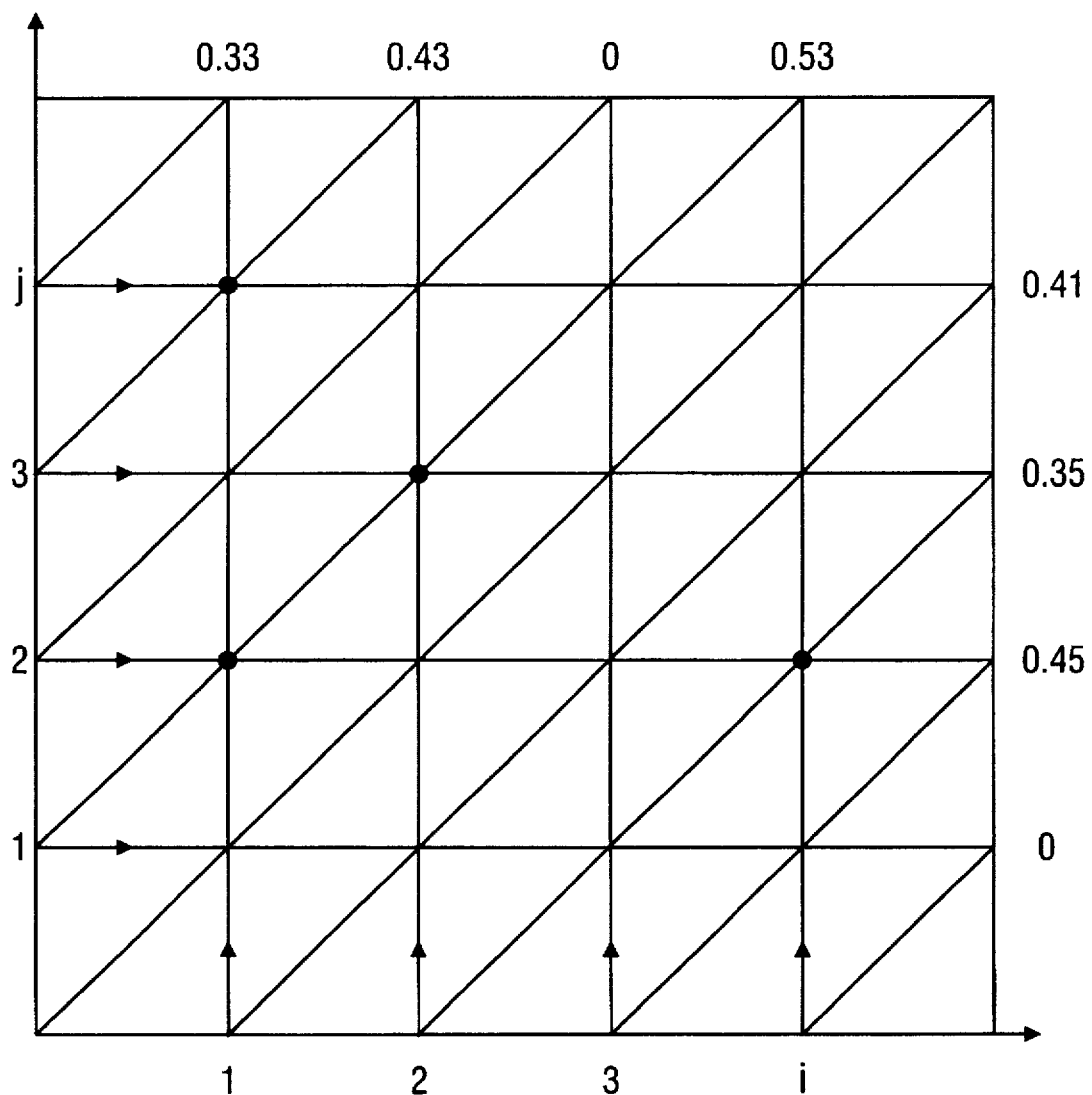
Figure 10B:
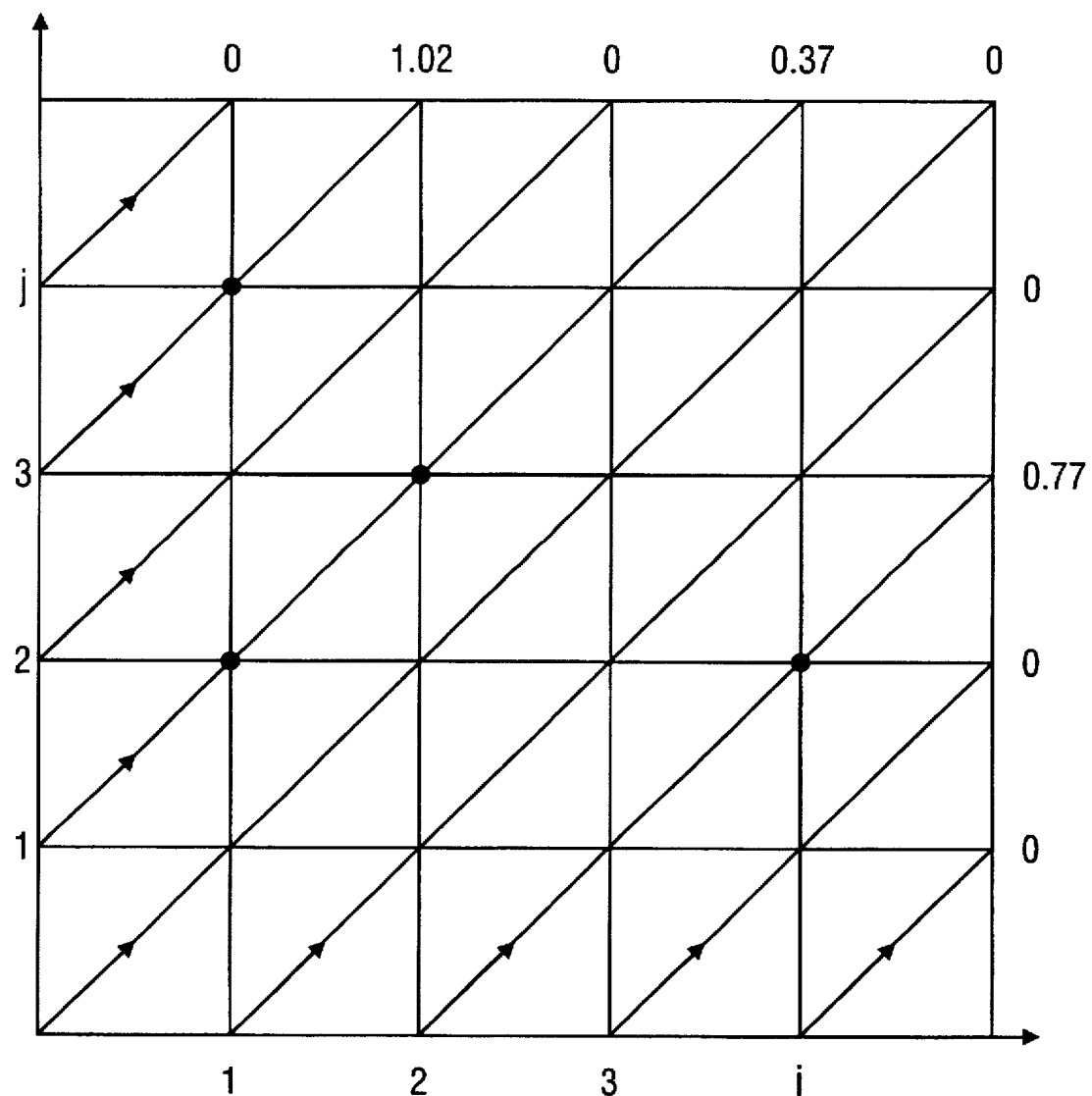

Scaling factors, $k_n$, are then determined for each given scan line by dividing the calibrated voltage by the back calculated voltage (i.e. $k_n=V_c'/V_B$), as depicted in FIGS. 10a and 10b. Thus, these figures correspond to block 560 in FIG. 5.

Figure 11:
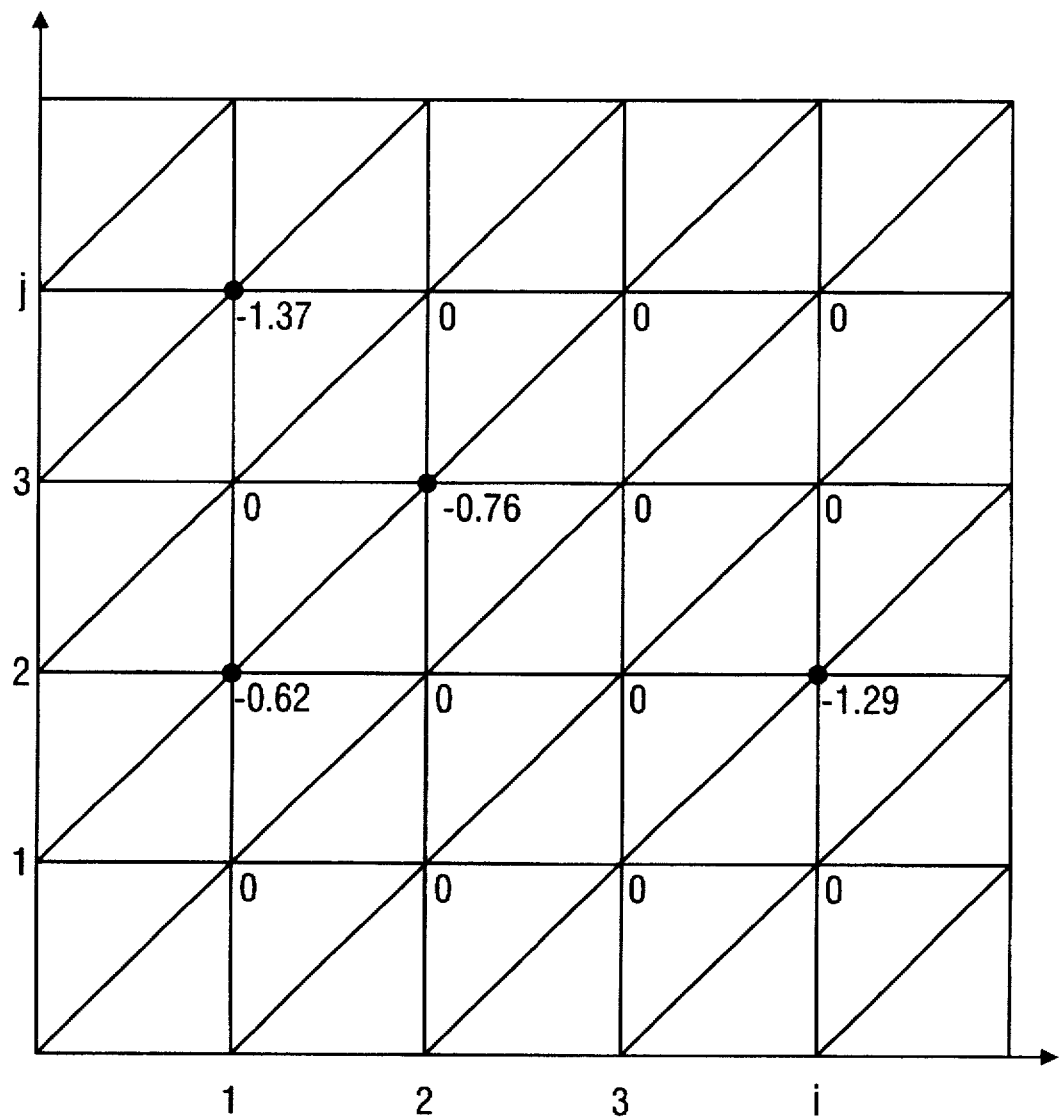

Next, the optimized voltage, $V_{OPT}$, is calculated for each pixel as the product of the scaling factors, k, and the average calibrated voltage, $V_c'$ (i.e. $V_{OPT}=k_1 k_2 k_3$ AVG($V_c'$)) which is depicted in FIG. 11. In this example, three scans (i.e. horizontal, vertical, and diagonal) were taken, and thus, each pixel will have three scaling factors corresponding to these scan lines. Thus, FIG. 11 corresponds to block 570 in FIG. 5.

This completes the first iteration.

This example illustrates one of many methods which could be used to generate a metal image from the attenuation measurements gathered. Any number of scans in any number of directions could be used. Further, a wide variety of scaling factors could be devised to weight the various measurements. Any number of numerical methods could be employed to estimate a solution to the equations generated. Lastly, a closed solution can be obtained by taking a larger number of scans.

Figure 12:
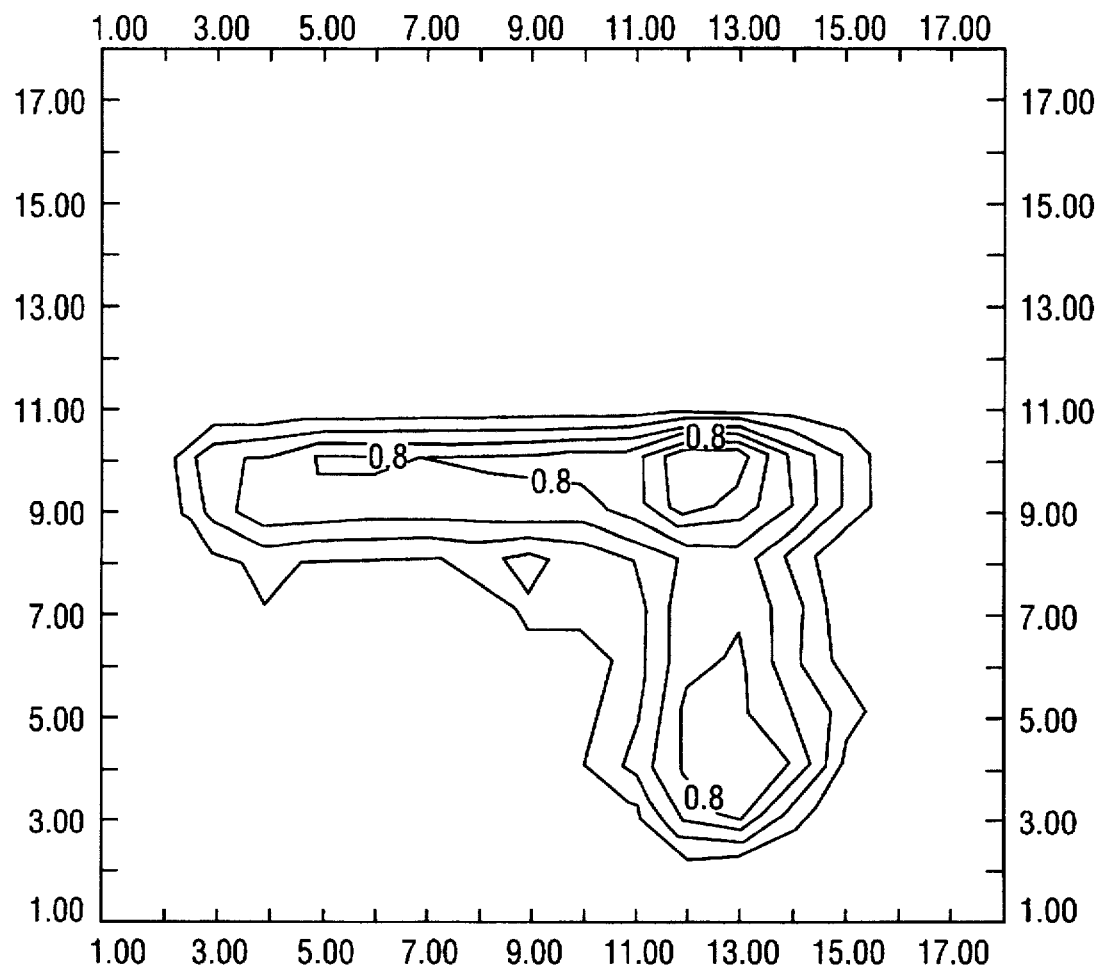
FIG. 12 is an example of a metal image generated by an imaging metal detector.

FIG. 12 is an example of a metal image generated by an imaging metal detector. A 5.5'×7' ferrite loop was used having sensors mounted to it at 1" intervals. The loop consisted of 0.188 diameter×0.375" length, type 33 ferrites bonded together end-to-end. The transmit sensors consisted of 50 wraps of wire around a 0.75" long ferrite rod, and the receive sensors consisted of 50 wraps of wire on a 1.5" long ferrite rod. Accuracy of up to 1" was achieved which provided a 66×84 pixel image.

The transmitter was operated at 83 kHz with a 20 volt peak-to-peak input.

The receiver was a two-stage amplifier, the first having a low pass filter, the second having a band pass filter with a Q of 10.

What is claimed is:

1. An imaging metal detector for forming an image of metallic objects in an imaged plane having a longest side, comprising:

a sensor ring including of a plurality of sensors wrapped around ferrite stubs mounted on a ferrite loop, said loop arranged to substantially surround said imaged plane, each sensor having a central axis directed inwardly from said loop into said imaged plane, each said sensor switchably coupled to a transmitter and to a receiver, each sensor having a diameter at most 1/20 times the longest side of the imaged plane such that transformer coupling effects are dominated by radar diffraction effects;

a transmit mux having an address input and a plurality of outputs, one of said plurality of outputs switchably coupled to each sensor, said transmit mux also coupled to a computer for receiving a transmit address code;

a transmitter coupled to said input of said transmit mux;

a receiver mux having at least one output and a plurality of inputs, one of said plurality of inputs coupled to each sensor, said receiver mux also coupled to said computer for receiving a receive address code;

at least one receiver coupled to said at least one output of said receiver mux, said at least one receiver having an output coupled to said computer;

the computer being programmed to:

provide said transmit address codes to said transmit mux and said receive address codes to said receiver mux; and receive image data from said at least one receiver and to process that data to generate a metal image indicating the distribution of metal in the imaged plane; and a monitor coupled to said computer and adapted to display said metal image.

2. The apparatus of claim 1, further comprising a photographic camera adapted to provide a video image of the imaged plane and transmit said video image to said monitor, said metal image being overlaid on said video image.

3. The apparatus of claim 1, wherein said computer is further programmed to compare said metal image with a set of threat-match images and locate a matching threat-match image.

4. The apparatus of claim 1, further comprising a photographic camera adapted to provide a video image of said imaged plane and transmit said video image to said monitor, said matching threat-match image being overlaid on said video image.

5. The apparatus of claim 1, wherein said transmitter transmits at a frequency between 5 and 85 kHz.

6. A method of detecting the presence and distribution of metal in an imaged plane, comprising:

providing a sensor ring including a plurality of transceiver sensors each said sensors having a relatively small diameter to maximum side length ratio such that transformer coupling effects are dominated by radar diffraction effects, a transmitter, a receiver, a computer, and a monitor;

transmitting a signal from selected ones of said transceiver sensor in turn and receiving corresponding received signals from other selected ones of the transceiver sensors and providing information representative of said received signals to said computer;

repeating said transmitting and receiving steps using a different transmitter in said transmitting step until a sufficient number of attenuated signals have been calculated to generate an image of said metal of a resolution not less than 2.0 to 0.25 inches; and generating a metal image of said metal from the information provided to the computer; and displaying said metal image on said monitor.

7. The method of claim 6, further comprising the steps of comparing said metal image to a set of threat-match images and locating any match.

8. The method of claim 6, further comprising the steps of:

providing a camera for providing optical information;

generating a video image of said imaged plane with said camera; and overlaying said video image with said metal image.

9. The method of claim 6, further comprising the steps of:

frequency sweeping directly after said calculating step consisting of repeating the transmitting and receiving steps using the same sensors and a different transmitter frequency in said transmitting step until a sufficient number of attenuated signals have been calculated to generate a multi-frequency profile of said metal to the desired accuracy; and generating a multi-frequency profile of said metal.

10. The method of claim 6, further comprising the step of comparing said multi-frequency profile to a set of match-metal profiles and locating any match.

11. The method of claim 10 further comprising the step of displaying the match-metal profile information with a photographic or x-ray image of said metal.

12. The method of claim 6 wherein said generating step further comprises:

calibrating said representative information with respect to signals taken with no metal in said imaged plane to derive calibrate information;

calculating a raw image; and optimizing said raw image to approximately match said calibrated information to derive optimized information.

13. The method of claim 6 wherein said representative information comprises raw voltages and said generating step further comprises:

calibrating said raw voltages with respect to reference voltages taken with no metal in said imaged plane to derive calibrate voltages;

calculating a raw image; and optimizing said raw image to approximately match said calibrated voltages to derive optimized voltages.

14. The method of claim 13 wherein said calibrating step further comprises:

referencing said raw voltages to said reference voltages; and calibrating said raw voltages to correct for the signal gain caused by the position of said transceiver sensor which provided the raw voltage.

15. The method of claim 13 wherein said step of calculating a raw image further comprises:

adding said calibrated voltages corresponding to a given pixel; and calculating the back calculated voltage corresponding to said raw image.

16. The method of claim 15 wherein said optimizing step further comprises:

dividing said calibrated voltage by said back calculated voltage for each scan line to derive a scaling constant;

multiplying said scaling constant for each scan line passing through a given pixel by the average of said calibrated voltages for said pixel to derive an optimized voltage; and repeating said dividing and multiplying step with the optimized voltage used as said raw image until said product of scaling factors is within a preselected threshold.

17. The method of claim 6 wherein said selected ones of said transceiver sensor comprises at least two such sensor which are phase coherent.

18. A method of detecting the presence and distribution of metal in an imaged plane having a maximum side length, comprising:

providing a sensor loop including a plurality of sensors having a relatively small diameter to maximum side length ratio such that transformer coupling effects are dominated by radar diffraction effects;

transmitting a signal from at least one said sensor to at least one other sensor;

receiving an attenuated signal at said at least one other sensor and providing information representative of said attenuated signal;

repeating said transmitting and receiving steps using a different transmitter in said transmitting step until a sufficient number of attenuated signals have been received to generate an image of said metal of desired detail; and generating a metal image of said metal from the representative information provided.

19. The method of claim 18, further comprising the steps of comparing said metal image to a set of threat-match images and locating any match.

20. The method of claim 18, further comprising the steps of:

providing a camera for providing optical information;

generating a video image of said imaged plane with said camera; and overlaying said video image with said metal image.

21. The method of claim 18, further comprising the steps of:

frequency sweeping directly after said calculating step consisting of repeating the transmitting and receiving steps using the same sensors and a different transmitter frequency in said transmitting step until a sufficient number of attenuated signals have been calculated to generate a multi-frequency profile of said metal to the desired accuracy; and generating a multi-frequency profile of said metal.

22. The method of claim 21, further comprising the step of comparing said multi-frequency profile to a set of match-metal profiles and locating any match.

23. The method of claim 22 further comprising the step of displaying the match-metal profile information with a photographic or x-ray image of said metal.

24. The method of claim 18 further comprising the steps of:

repeating said transmitting, receiving, repeating, and generating steps after a preselected time interval; and generating a three-dimensional image of said metal.

25. The method of claim 18 wherein said generating step further comprises:

calibrating said representative information with respect to signals taken with no metal in said imaged plane to derive calibrate information;

calculating a raw image; and optimizing said raw image to approximately match said calibrated information to derive optimized information.

26. The method of claim 18 wherein said representative information comprises raw voltages and said generating step further comprises:

calibrating said raw voltages with respect to reference voltages taken with no metal in said imaged plane to derive calibrate voltages;

calculating a raw image; and optimizing said raw image to approximately match said calibrated voltages to derive optimized voltages.

27. The method of claim 26 wherein said calibrating step further comprises:

subtracting said reference voltages from said raw voltages; and calibrating said raw voltages to correct for the signal gain caused by the position of said transceiver sensor which provided the raw voltage.

28. The method of claim 27 wherein said step of calculating a raw image further comprises:

adding said calibrated voltages corresponding to a given pixel; and calculating the back calculated voltage corresponding to said raw image.

29. The method of claim 26 wherein said optimizing step further comprises:

dividing said calibrated voltage by said back calculated voltage to derive a scaling constant for each scan line;

multiplying said scaling constant by the sum of said calibrated voltages for each pixel on the scan line to derive a corrected attenuation; and repeating said dividing and multiplying step with said average calibrated voltage equal to said optimized voltage until said product of scaling constants is within a preselected threshold.

30. The method of claim 18, further comprising the step of displaying the metal image on a monitor.

31. An imaging metal detector for forming an image of metallic objects in an imaged plane having a maximum side length, comprising:

a sensor ring having a plurality of sensors wrapped around ferrite stubs mounted on a ferrite loop, said loop arranged to substantially surround said imaged plane, each sensor having a central axis directed inwardly from said loop into said imaged plane, each sensor having a relatively small diameter to maximum side length ratio such that transformer coupling effects are dominated by radar diffraction effects;

a transmitter having an address input and a plurality of outputs, one of said plurality of outputs switchably coupled to each sensor; and a receiver having at least one output and a plurality of inputs, one of said plurality of inputs switchably coupled to each sensor.

32. The apparatus of claim 31, further comprising a monitor coupled to said computer and adapted to display the metal image.

33. The apparatus of claim 32, wherein said computer is further programmed to compare said metal image with a set of threat-match images and located a matching threat-match image.

34. The apparatus of claim 33, further comprising a photographic camera adapted to provide a video image of said imaged plane and transmit said video image to said monitor, said matching threat-match image being overlaid on said video image.

35. The apparatus of claim 31, further comprising a photographic camera adapted to provide a video image of the imaged plane and transmit said video image to said monitor, said metal image being overlaid on said video image.

36. The apparatus of claim 31, where in said transmitter transmits at a frequency corresponding to a wavelength at least ten times larger than the longest dimension of said loop.

* * * * *

UNITED STATES PATENT AND TRADEMARK OFFICE
CERTIFICATE OF CORRECTION

PATENT NO.    :   5,790,685
DATED         :   August 4, 1998
INVENTOR(S)   :   Bradley T. Sallee It is certified that error appears in the above-identified patent and that said Letters Patent is hereby corrected as shown below:

In claim 33, column 12, line 39, delete "located" and insert --locating--..

Signed and Sealed this

Twentieth Day of October, 1998

Attest:

BRUCE LEHMAN

Attesting Officer

Commissioner of Patents and Trademarks